United States Patent [19]

Fisher et al.

[11] 4,027,959
[45] June 7, 1977

[54] MICROFORM VIEWER FOR USE WITH A RIGID FRAME

[76] Inventors: Billie Eugene Fisher, 1608 Squirrel Tree Place, Edmond, Okla. 73034; Thompson Eugene Hodges, 415 Macy, Norman, Okla. 73069

[22] Filed: June 30, 1975

[21] Appl. No.: 591,643

[52] U.S. Cl. .................. 353/77; 353/119
[51] Int. Cl.² ........................... G03B 21/22
[58] Field of Search ............. 353/122, 74–79, 353/27 R, 27 A, 26 R, 26 A, 119; 248/11; 312/20; 352/242, 243, 104; 178/7.81

[56] References Cited
UNITED STATES PATENTS

| | | | |
|---|---|---|---|
| 1,991,493 | 2/1935 | Cornelius | 248/11 |
| 2,304,921 | 12/1942 | Hopkins | 353/79 |
| 2,413,922 | 1/1947 | Jensen et al. | 178/7.81 |
| 2,499,579 | 3/1950 | Fritsch | 178/7.81 |
| 2,659,267 | 11/1953 | Baule | 350/121 |
| 2,700,917 | 2/1955 | Peters | 353/78 |
| 2,912,900 | 11/1959 | Cherouvrier | 353/26 R |
| 3,319,517 | 5/1967 | Rondas et al. | 353/27 R |
| 3,627,241 | 12/1971 | Santirocco | 353/74 |
| 3,843,242 | 10/1974 | Moscaret | 248/11 |
| 3,861,233 | 1/1975 | Miyamoto | 178/7.81 |
| 3,950,086 | 4/1976 | Schulman | 353/119 |

*Primary Examiner*—Harry N. Haroian
*Attorney, Agent, or Firm*—Dunlap, Codding & McCarthy

[57] ABSTRACT

A microform viewer for use with a rigid frame, the viewer having a housing pivotal about a longitudinal pivot axis and an end transverse pivot axis, a microform projector mounted on the upper surface of the housing and projecting a microform image downwardly along a projection axis, a viewing screen mounted in an opening in the upper surface of the housing, a reflector connected to the housing and reflecting the microform image upwardly onto the viewing screen, and rotation means connected between the housing and the frame for pivoting the housing about the longitudinal pivot axis and the end transverse pivot axis.

6 Claims, 5 Drawing Figures

MICROFORM VIEWER FOR USE WITH A RIGID FRAME

BACKGROUND OF THE INVENTION

1. Field of the Invention

This invention relates generally to microform projectors and, more particularly, but not by way of limitation, to a microform projector which is pivotal about both a longitudinal pivot axis and an end transverse pivot axis.

2. Description of the Prior Art

Although the various cost advantages, in terms of acquisition, storage and replacement, are well known to the large scale users of printed materials, such users are often hesitant about converting from the conventional mode of information exchange using paper media to the more economical mode using microform media for a variety of reasons. One of the reasons for delaying such a conversion is the current unavailability of a microform viewer suitable for use in a library environment.

In general, current microform viewers are subject to one or more of a variety of limitations: small viewing screen dimensions; restrictive ambient light requirements; excessive cost; frequency of breakdown and difficulty of repair; unnatural viewing screen position; and inconvenient loading/unloading procedures. While some commercially available microform viewers exhibit generally acceptable characteristics as to some of these limitations, no viewer available at this time can be considered to be fully satisfactory for use in a library environment by relatively untrained users over the prolonged periods of use which may be reasonably anticipated when employed in such as a university research facility.

SUMMARY OF THE INVENTION

It is an object of this invention to provide a microform viewer suitable for use in a library environment.

It is another object of this invention to provide a simple and convenient microform viewer which may be used comfortably by a relatively untrained user over a prolonged period of time.

It is a further object of this invention to provide a microform viewer which is rugged in construction, simple to repair and economical both in manufacture and repair.

Still another object of this invention is to provide a microform viewer having a large viewing screen suitable for displaying a full newspaper page.

Yet another object of this invention is to provide a microform viewer which is pivotal about both a longitudinal pivot axis and an end transverse pivot axis.

Other objects and advantages of the present invention will be evident from the following detailed description when read in conjunction with the accompanying drawings which illustrate various elements of the preferred embodiment of the invention.

DESCRIPTION OF THE PREFERRED EMBODIMENT

Figure 1:
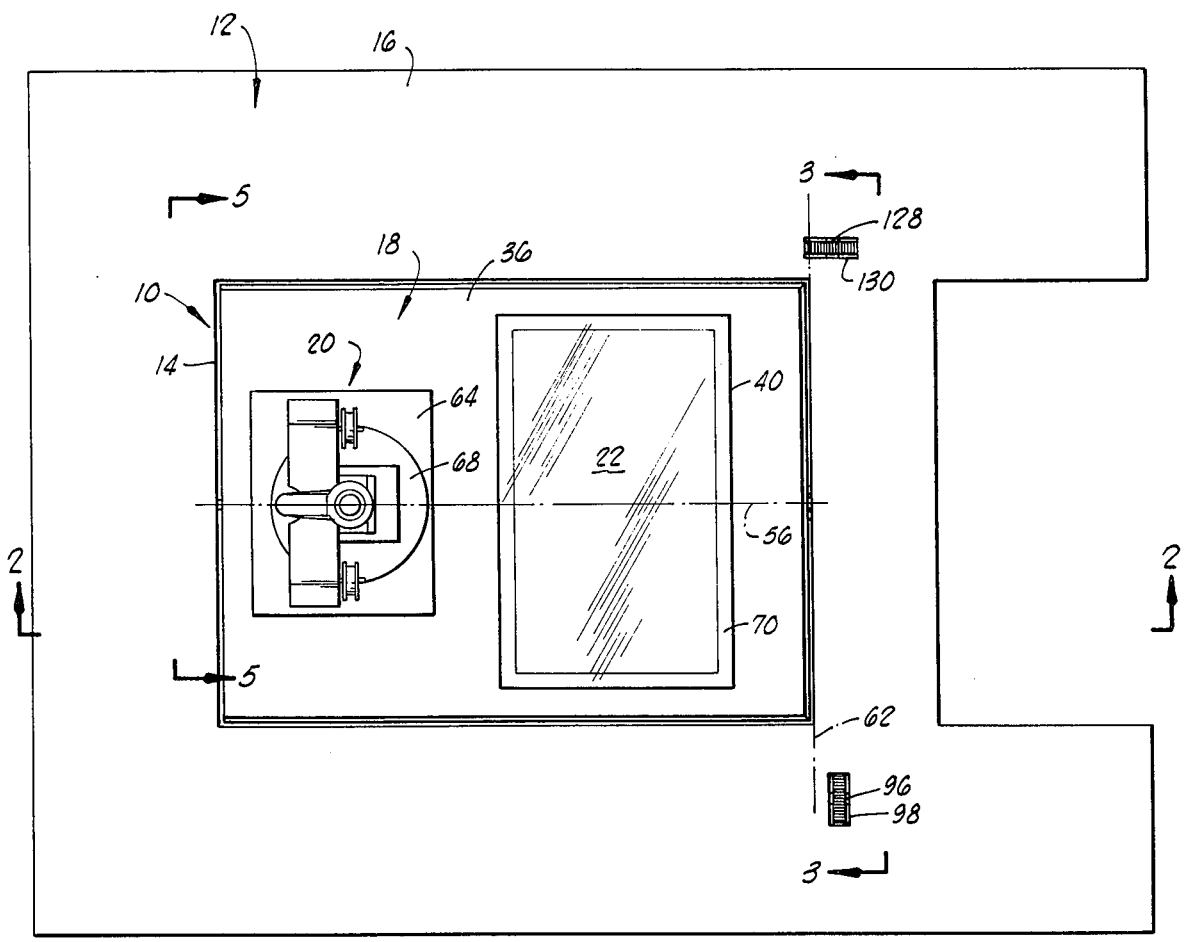
FIG. 1 is a plan view of a microform viewer constructed in accordance with the present invention.
Figure 2:
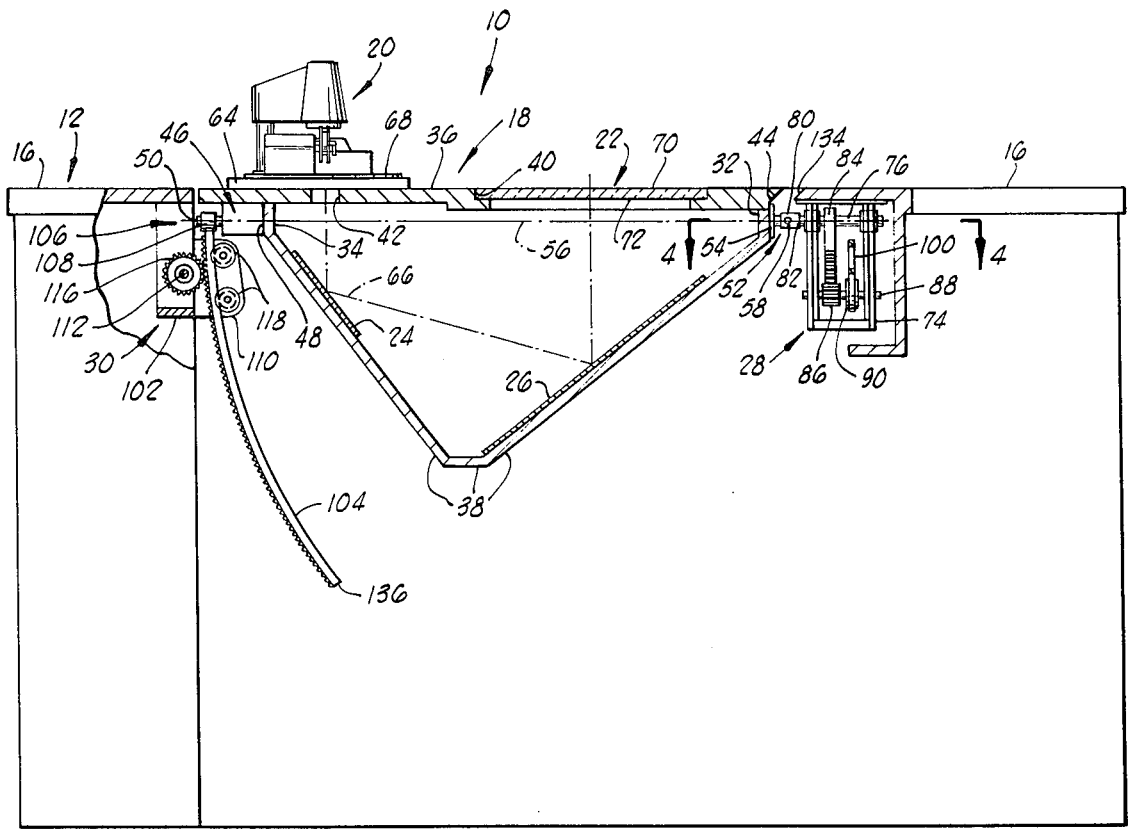
FIG. 2 is a cross sectional view of the microform viewer taken along the line 2—2 in FIG. 1.

Referring to the drawings in general and to FIGS. 1 and 2 in particular, shown therein and designated by the general reference number 10 is a microform viewer constructed in accordance with the preferred embodiment of the present invention. The microform viewer 10 is designed to be used with a rigid frame 12, such as a table or the like, having an appropriately sized hole 14 in the upper surface 16 thereof. Preferably, the frame 12 will be sufficiently large so as to provide horizontal work space adjacent to the viewer 10 for the convenience of the user.

The microform viewer 10 is primarily comprised of a housing 18, a microform projector 20, a viewing screen 22, a pair of reflectors 24 and 26, a longitudinal rotation assembly 28 and a transverse rotation assembly 30. The housing 18 has a front end 32, a rear end 34, an upper surface 36 and a complex lower surface 38. The upper surface 36, which overhangs both the front end 32 and the rear end 34, has an opening 40 therethrough near the front end 32, and an opening 42 therethrough near the rear end 34. The edge 44 of the upper surface 36 overhanging the front end 32 may be appropriately shaped so as to provide a smoothing interface between the housing 18 and the frame 12 for reasons which will become evident from the discussion below.

The housing 18 has a rear pivot pin 46 connected by one end 48 thereof, substantially perpendicularly to the middle portion of the rear end 34 slightly below the upper surface 36. The rear pivot pin 46 has the other end 50 thereof pivotally connected to the transverse rotation assembly 30 in a manner which will be more fully described below. A front support pin 52 is connected by one end 54 thereof, substantially perpendicularly to the middle of the front end 32 of the housing 18 with the longitudinal axis of the front support pin 52 being axially aligned with the longitudinal axis of the rear pivot pin 46. The rear pivot pin 46 and the front support pin 52 cooperate to provide the housing 18 with a longitudinal pivot axis (indicated by the dotted line 56 in FIGS. 1 and 2) lying slightly below and parallel to the upper surface 36 and intersecting substantially perpendicularly the front end 32 and the rear end 34.

The front support pin 52 has a front pivot pin 58 (also see FIG. 4) disposed substantially perpendicularly through the other end 60 thereof so that the longitudinal axis of the front pivot pin 58 is substantially parallel to the upper surface 36 of the housing 18. The front pivot pin 58 is pivotally connected to the longitudinal rotation assembly 28 in a manner which will be more fully described below. The front pivot pin 58 provides the housing 18 with an end transverse pivot axis (indicated by the dotted line 62 in FIGS. 1 and 4) lying substantially parallel to the front end 32 and the upper surface 36, and perpendicularly intersecting the longitudinal pivot axis 56.

The microform projector 20 is of conventional design for projecting a microform image from such as a frame of microfilm or microfiche. The microform projector 20, shown in FIGS. 1 and 2, is patterned ater the Recordak Film Reader, Model MPE-1, manufactured by Eastman Kodak Co. of Rochester, N.Y., which displays the preferred characteristics of simplicity of operation and repair.

The projector 20 is mounted on the upper surface 36 of the housing 18 via a mounting base 64, so that the microform image is projected downwardly through the opening 42 along a projection axis 66. In the preferred embodiment, the mounting base 64 has a rotatable portion 68 allowing the rotation of the projector 20 about the projection axis 66 so that the microform image may be rotated if desired.

The viewing screen 22 is formed from a translucent material and has an upper surface 70 and a lower surface 72. The lower surface 72 should be suitably prepared in a conventional manner so as to be light dispersive. The upper surface 70 is preferably prepared so as to be glare retardant for the comfort of the user. The screen 22 is mounted in the opening 40 in the upper surface 36 of the housing 18 so as to be substantially flush with the upper surface 36.

The pair of reflectors 24 and 26 are connected to the lower surface 38 of the housing 18 below the upper surface 36 thereof. The first reflector 24 is positioned across the projection axis 66 of the microform image projected by the projector 20 and reflects the image toward the second reflector 26. The second reflector 26 is positioned across the reflection path of the first reflector 24 and reflects the microform image upwardly onto the lower surface 72 of the viewing screen 22. Although two reflectors are used in the preferred embodiment, it will be apparent to those skilled in the art that various other arrangements of one or more reflectors would be suitable for reflecting the microform image upwardly onto the lower surface 72 of the viewing screen 22.

Figure 3:
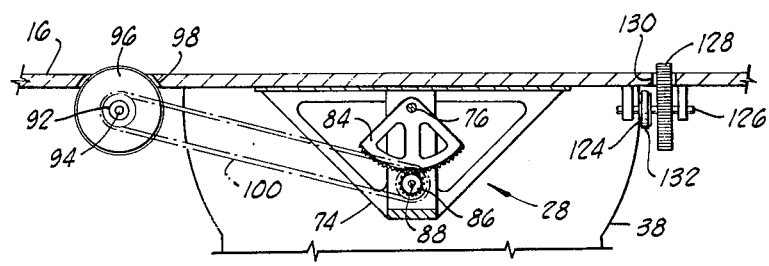
FIG. 3 is a cross sectional view of the microform viewer taken along the line 3—3 in FIG. 1.
Figure 4:
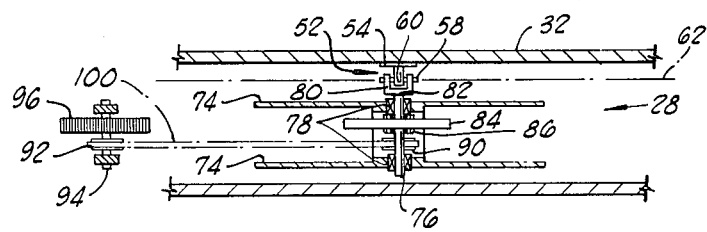
FIG. 4 is a cross sectional view of the microform viewer taken along the line 4—4 in FIG. 2.

The longitudinal rotation assembly 28 is connected between the front end 30 of the housing 18 and the frame 12 for pivoting the housing 18 about the longitudinal pivot axis 56. As shown in FIG. 3, the longitudinal rotation assembly 28 has a generally triangular front brace 74 connected by conventional fastening means to the frame 12 adjacent to the front end 32 of the housing 18. As shown in FIG. 4 a shaft 76 is journalled in the front brace 74 via a pair of bearings 78, with the rotational axis of the shaft 76 being substantially horizontal and aligned with the longitudinal pivot axis 56 when the upper surface 36 of the housing 18 is flush with the upper surface 16 of the frame 12. The shaft 76 has a yoke 80 on one end 82 thereof, and a front gear section 84 axially mounted on the medial portion of the shaft 76. The yoke 80 is sized to receive the front support pin 52 and to be pivotally connected thereto via the front pivot pin 58.

A front pinion 86 on a front pinion shaft 88 is rotatably connected to the front brace 74 so as to mesh with the front gear section 84. A front driven pulley 90 is mounted on the front pinion shaft 88 adjacent to the front pinion 86. A front drive pulley 92 on a longitudinal control handwheel shaft 94 is rotatably connected to the underside of the upper surface 16 of the frame 12 so as to be radially aligned with the front driven pulley 90. A longitudinal control handwheel 96 is mounted on the longitudinal control handwheel shaft 94 with access to the longitudinal control handwheel 96 being provided via a hole 98 in the upper surface 16 of the frame 12. A flexible belt 100 connects the front drive pulley 92 to the front driven pulley 90 so that rotation of the longitudinal control handwheel 96 is communicated to the front gear section 84 via the front drive pulley 92, the belt 100, the front driven pulley 90, and the front pinion 86. Rotation of the front gear section 84 is communicated to the housing 18 via the yoke 80, the front pivot pin 58 and the front support pin 52, so that the housing 18 is pivoted about the longitudinal pivot axis 56. Preferably, either the front pinion shaft 88 or the longitudinal control handwheel shaft 94 is provided with a conventional frictional brake assembly so that the housing 18 pivots about the longitudinal pivot axis 56 only in response to the rotation of the longitudinal control handwheel 96 by a user.

Figure 5:
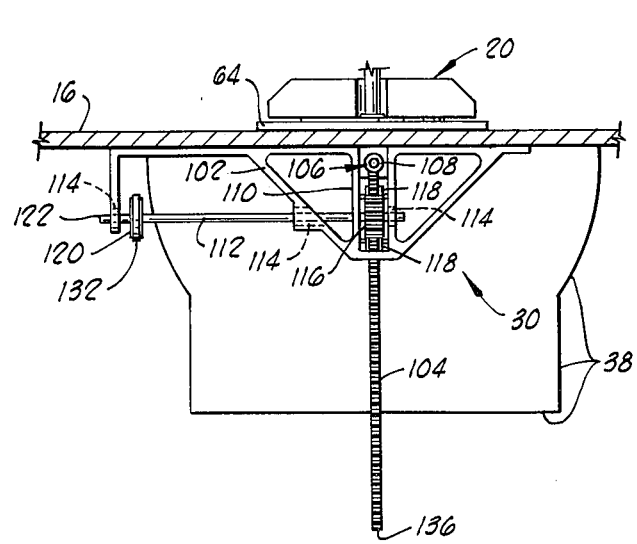
FIG. 5 is a cross sectional view of the microform viewer taken along the line 5—5 in FIG. 1.

The transverse rotation assembly 30 is connected between the rear end 34 of the housing 18 and the frame 12 for pivoting the housing 18 about the end transverse pivot axis 62. As shown in FIG. 5, the transverse rotation assembly 30 has a generally triangular, rear brace 102 connected by conventional fastening means to the frame 12 adjacent to the rear end 34 of the housing 18. A rear gear section 104 is pivotally connected at an upper end 106 thereof to the rear pivot pin 46 via a bearing 108. The rear gear section 104 is disposed substantially vertically through a channel portion 110 of the rear brace 102 so that the rotational axis of the rear gear section 104 is substantially horizontal and intersects the longitudinal pivot axis 56 at the intersection of the latter with the end transverse pivot axis 62.

A rear pinion shaft 112 is journalled in the rear brace 102 via a plurality of bearings 114, with the rotational axis of the rear pinion shaft 112 being substantially horizontal and parallel to the end transverse pivot axis 62 when the upper surface 36 of the housing 18 is flush with the upper surface 16 of the frame 12. The rear pinion shaft 112 has a rear pinion 116 mounted thereon so as to mesh with the rear gear section 104. A pair of flanged idler rollers 118 are rotatably connected to the channel portion 110 of the rear brace 102 so as to bear against the rear gear section 104 and maintain effective engagement between the rear pinion 116 and the rear gear section 104.

A rear driven pulley 120 is mounted on the rear pinion shaft 112 near one end 122 thereof. A rear drive pulley 124 (see FIG. 3) on a transverse control handwheel shaft 126 is rotatably connected to the underside of the upper surface 16 of the frame 12 so as to be radially aligned with the rear driven pulley 120. A transverse control handwheel 128 is mounted on the transverse control handwheel shaft 126 with access to the transverse control handwheel 128 being provided via a hole 130 in the upper surface 16 of the frame 12. A flexible belt 132 connects the rear drive pulley 124 to the rear driven pulley 120 so that rotation of the transverse control handwheel 128 is communicated to the rear gear section 104 via the rear drive pulley 124, the belt 132, the rear driven pulley 120 and the rear pinion 116. Rotation of the rear gear section 104 is communicated to the housing 18 via the rear pivot pin 46 so that the housing 18 is pivoted about the end transverse pivot axis 62. Preferably, either the rear pinion shaft 112 or the transverse control handwheel shaaft 126 is provided with a conventional frictional brake assembly so that the housing 18 pivots about the end transverse pivot axis 62 only in response to the rotation of the transverse control handwheel 128 by a user.

OPERATION OF THE PREFERRED EMBODIMENT

For reasons of economy in minimizing initial acquisition expense, the microform viewer 10 is designed to be used with, and integrated into, substantially any frame 12 which has a sufficiently large horizontal upper surface 16. To employ such a frame 12, the hole 14 should be formed according to the dimensions of the upper surface 36 of the housing 18, with a slant cut lip 134 provided adjacent to the slant cut lip 44 on the upper surface 36 of the housing 18, if desired. The longitudinal rotation assembly 28 should then be connected by any convenient manner, such as by using screws, to the underside of the upper surface 16 of the frame 12 so that the yoke 80 is substantially centered under the lip 134 and extends a slight distance beyond the lip 134 for evident reasons. The transverse rotation assembly 30, less the rear gear section 104, should then be connected in a similar manner to the underside of the upper surface 16 of the frame 12 at the rear of the hole 14. The longitudinal and transverse control handwheels 96 and 128, respectively, may then be positioned in a convenient operative position and the holes 98 and 130 formed so as to allow the handwheels to extend through the upper surface 16 of the frame 12.

To connect the housing 18 to the assembled longitudinal and transverse rotation assemblies 28 and 30, respectively, the housing 18, with the front support pin 52 and the rear pivot pin 46 connected thereto, should be lowered from above until the front support pin 52 enters the yoke 80 and the front pivot pin 58 inserted through the yoke 80 and the front support pin 52. The front pivot pin 58 may be retained in position by any suitable means such as by using a snap ring retainer.

The rear gear section 104 may then be connected to the rear pivot pin 46 via the bearing 108, with suitable retaining means employed if desired. The housing 18 and rear gear section 104 may then be pivoted about the front pivot pin 58 so as to lower the rear gear section 104 into the channel portion 110 of the brace 102 until the lower end 136 of the rear gear section 104 engages the rear pinion 116. The rear pinion 116 should then be rotated in the appropriate direction via the transverse control handwheel 128, so as to pull the rear gear section 104 downwardly into effective engagement with the rear pinion 116 and the pair of flanged idler rollers 118. The rear gear section 104 may be prevented from being inadvertently disengaged from the rear pinion 116 through excessive vertical extension by having a retaining clamp or the like positioned across the lower end 136 thereof after the lower end 136 has passed downwardly through the channel portion 110.

Once the housing 18 has been connected to the frame 12 in accordance with the above described procedure, the microform viewer 10 is substantially ready for use. However, in some circumstances it may be desirable to perform the above procedure with the microform projector 20 removed from the housing 18. If such is the case, then clearly the microform projector 20 should be reconnected in the appropriate manner to the upper surface 36 of the housing 18 after the housing 18 has been fully connected to the frame 12. Note also that any additional user controls, such as remote power, focus or frame advance controls, may be connected to the frame 12 at convenient locations, as appropriate, depending upon the particular microform projector 20 utilized.

In operation, the microform medium should be loaded into the microform projector 20 in the appropriate manner, with access to the projector 20 being convenient from the normal user position near the front end 32 of the housing 18. The microform projector 20 may then be actuated using appropriate controls so as to project a particular microform image downwardly along the projection axis 66 toward the reflector 24. The microform image is reflected by the reflector 24 towards the reflector 26. The reflector 26, in turn, reflects the microform image upwardly onto the lower, preferably light dispersive surface 72 of the viewing screen 22. The light comprising the microform image is scattered by the action of the lower surface 72 and passes through the translucent viewing screen 22 for viewing by the user. Appropriate manipulation of the microform projector 20 controls will bring the microform image into satisfactory focus on the viewing screen 22.

Since it is generally uncomfortable to read material which is either substantially horizontal or vertical, the microform viewer 10 is designed to be pivotal so as to allow the user to adjust the angle of the viewing screen 22 to accommodate for individual comfort requirements. In particular, the orientation of the microform viewer 10 can be adjusted in order to minimize the deleterious effects of glare arising from the use of the viewer 10 in a library environment. As a further measure, the upper surface 70 of the viewing screen 22 is preferably prepared using conventional methods so as to be glare retardant.

The longitudinal rotation assembly 28 in cooperation with the pivotal connection between the rear pivot pin 46 and the frame 12 via the transverse rotation assembly 30, allows the "roll" of the housing 18 to be continuously varied from a substantially horizontal position to an inclined position. As will be clear to one skilled in the art, the maximum degree of inclination in either direction from horizontal is dependent upon the number of degrees of arc spanned by the front gear section 84, which in the preferred embodiment will be on the order of 45° in each direction.

For example, in order to increase the roll of the housing 18 to the right and thereby the viewing angle of the viewing screen 22, the longitudinal control handwheel 96 should be rotated towards the left as viewed from the normal user position. The rotation of the longitudinal control handwheel 96 is communicated to the front pinion 86 via the longitudinal control handwheel shaft 94, the front drive pulley 92, the belt 100, the front driven pulley 90, and the front pinion shaft 88. Since the front gear section 84 is maintained in meshed engagement with the front pinion 86 by the front brace 74, the rotation of the front pinion 86 results in the clockwise rotation of the front gear section 84 as viewed in FIG. 3. The rotation of the front gear section 84 is communicated to the housing 18 via the shaft 76 with yoke 80, the front pivot pin 58 and the front support pin 52, thereby causing the rotation of the housing 18 about the rear pivot pin 46 and the longitudinal pivot axis 56 passing coaxially therethrough. The resultant rotation of the housing 18 and the viewing screen 22 is perceived as an increase in the roll of the viewing screen 22 to the right.

The housing 18 may be rolled to the left in a manner substantially opposite to that described immediately above, merely by rotating the longitudinal control handwheel 96 toward the right as viewed from the normal user position. Thus by rotating the longitudinal control handwheel 96 in an appropriate direction, the roll of the viewing screen 22 can be adjusted so as to maximize viewing comfort.

The transverse rotation assembly 30 in cooperation with the pivotal connection between the front pivot pin 58 and the frame 12 via the longitudinal rotation assembly 28, allows the "pitch" of the housing 18 to be continuously varied from a substantially horizontal position to an inclined position. As will be clear to one skilled in the art, the maximum degree of inclination is dependent upon the number of degrees of arc spanned by the operative portion of the rear gear section 104, which in the preferred embodiment will be on the order of 45°.

For example, in order to increase the pitch of the housing 18 and thereby the viewing angle of the viewing screen 22, the transverse control handwheel 128 should be rotated away from the normal user position and towards the rear end 34 of the housing 18. The rotation of the transverse control handwheel 128 is communicated to the rear pinion 116 via the transverse control handwheel shaft 126, the rear drive pulley 124, the belt 132, the rear driven pulley 120 and the rear pinion shaft 112. Since the rear gear section 104 is maintained in meshed engagement with the rear pinion 116 by the combined action of the channel portion 110 of the rear brace 102 and the pair of flanged idler rollers 118, the rotation of the rear pinion 116 results in the upward movement of the rear gear section 104. The upward movement of the rear gear section 104 is communicated to the housing 18 via the rear pivot pin 46 journalled in the upper end 106 of the rear gear section 104, thereby causing the rotation of the housing 18 about the front pivot pin 58 and the end transverse pivot axis 62 passing coaxially therethrough. The resultant upward movement of the rear end 34 of the housing 18 is perceived as an increase in the pitch of the housing 18 and the viewing screen 22 integral therewith.

The pitch of the housing 18 may be decreased in a manner substantially opposite to that described immediately above, merely by rotating the transverse control handwheel 128 toward the normal user position and the front end 32 of the housing 18. Thus by rotating the transverse control handwheel 128 in an appropriate direction, the pitch of the viewing screen 22 can be adjusted so as to maximize viewing comfort.

Although the operation of the longitudinal and transverse rotation assemblies 28 and 30, respectively, have been described separately above, it is clear that the operations can be performed in a combined manner. Thus the orientation of the viewing screen 22 may be adjusted much as a book could be in order to suit the particular requirements of the environment and the user.

Changes may be made in the construction and the arrangement of the parts or the elements of the various embodiments as disclosed herein without departing from the spirit and scope of the invention as defined in the following claims.

What is claimed is:

1. A microform viewer comprising:
   a housing having a front end, a rear end, an upper surface with an opening therethrough near the front thereof, a longitudinal pivot axis intersecting substantially perpendicularly the middle of the front end of the housing and an end transverse pivot axis perpendicularly intersecting the longitudinal pivot axis near the front end of the housing;
   a microform projector mounted on the housing, the microform projector projecting a microform image along a projection axis;
   a viewing screen having an upper surface and a lower surface, mounted in the opening through the upper surface of the housing;
   a reflector connected to the housing beneath the upper surface thereof and across the projection axis, reflecting the microform image upwadly onto the lower surface of the viewing screen;
   a rigid frame having a hole in the upper surface thereof sized to receive the housing;
   longitudinal rotation means for pivoting the housing about the longitudinal pivot axis, the longitudinal rotation means having a rear portion connected between the rear end of the housing and the frame and a front portion connected between the front end of the housing and the frame; and
   transverse rotation means for pivoting the housing about the end transverse pivot axis, the transverse rotation means having a rear portion connected between the rear end of the housing and the frame and a front portion connected between the front end of the housing and the frame.

2. The viewer of claim 1 wherein the microform projector is further characterized as including a mounting base connected to the upper surface of the housing near the rear end thereof, the mounting base having a rotatable portion allowing the rotation of the microform projector about the projection axis.

3. The viewer of claim 1 wherein the upper surface of the viewing screen is further characterized as being glare retardant.

4. The viewer of claim 1 wherein the lower surface of the viewing screen is further characterized as being light dispersive.

5. The viewer of claim 1 wherein the longitudinal rotation means is further defined to include:
   a rear pivot pin pivotally connected between the frame and the rear end of the housing, the rotational axis of the rear pivot pin being coaxial with the longitudinal pivot axis of the housing;
   a front gear section pivotally connected between the frame and the front end of the housing, the rotational axis of the front gear section being coaxial with the longitudinal pivot axis of the housing;
   a front pinion rotatably connected to the frame and meshed with the front gear section; and,
   means for rotating the front pinion whereby the front gear section is rotated and the housing connected thereto is pivoted about the longitudinal pivot axis of the housing.

6. The view of claim 1 wherein the transverse rotation means is further defined to include:
   a front pivot pin pivotally connected between the frame and the front end of the housing, the rotational axis of the front pivot pin being coaxial with the end transverse pivot axis of the housing;
   a rear gear section connected to the rear end of the housing, the rear gear section having an arcuate circular section with the rotational axis of the rear gear section being substantially horizontal and intersecting the longitudinal pivot axis at the intersection of the longitudinal pivot axis with the end transverse pivot axis of the housing;
   a rear pinion rotatably connected to the frame and meshed with the rear gear section; and,
   means for rotating the rear pinion whereby the rear gear section is rotated and the housing connected thereto is pivoted about the end transverse axis of the housing.

* * * * *